(12) United States Patent
Hirata et al.

(10) Patent No.: US 10,780,554 B2
(45) Date of Patent: Sep. 22, 2020

(54) COMPONENT-TEMPORARILY HOLDING MEMBER, AND COMPONENT MOUNTING JIG

(71) Applicant: BRIDGESTONE CORPORATION, Tokyo (JP)

(72) Inventors: Yutaka Hirata, Tokyo (JP); Taichi Itabashi, Tokyo (JP); Yosuke Hamada, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 32 days.

(21) Appl. No.: 16/094,355

(22) PCT Filed: Apr. 18, 2017

(86) PCT No.: PCT/JP2017/015516
§ 371 (c)(1),
(2) Date: Oct. 17, 2018

(87) PCT Pub. No.: WO2017/183619
PCT Pub. Date: Oct. 26, 2017

(65) Prior Publication Data
US 2019/0126443 A1 May 2, 2019

(30) Foreign Application Priority Data
Apr. 18, 2016 (JP) .................................. 2016-083065

(51) Int. Cl.
*B25B 11/02* (2006.01)
*A47C 27/14* (2006.01)
(Continued)

(52) U.S. Cl.
CPC .............. *B25B 11/02* (2013.01); *A47C 27/14* (2013.01); *A47C 31/02* (2013.01); *B25B 5/06* (2013.01);
(Continued)

(58) Field of Classification Search
CPC .. B60N 2/5816; B60N 2/5825; B60N 2/5841; B29C 45/14262; B29C 45/14065;
(Continued)

(56) References Cited

U.S. PATENT DOCUMENTS 3,794,378 A * 2/1974 Haslam ................ B60N 2/5825
297/452.6
5,005,242 A 4/1991 Kennedy et al.
(Continued)

FOREIGN PATENT DOCUMENTS

JP 2003-053789 A 2/2003
JP 2011-010727 A 1/2011
(Continued)

OTHER PUBLICATIONS

International Search Report of PCT/JP2017/015516 dated Jul. 18, 2017.
(Continued)

*Primary Examiner* — Tyrone V Hall, Jr.
(74) *Attorney, Agent, or Firm* — Sughrue Mion, PLLC

(57) ABSTRACT

To provide a component-temporarily holding member and a component mounting jig that do not require removal of a component installation jig after a foamed resin molding is demolded. In a component-temporarily holding member 3 having a temporary holding part 2 for temporarily holding a component 5 having a locking part 6 lockable to another member when mounting the component 5 by locking the locking part 6 in a component mounting position 8 of a forming die 4 for a foamed resin molding, the holding force of the temporary holding part 2 is less than the force with which the locking part 6 is locked in the component mounting position 8.

7 Claims, 9 Drawing Sheets

(51) Int. Cl.
  *B29C 39/12* (2006.01)
  *B29C 44/58* (2006.01)
  *B29C 44/00* (2006.01)
  *A47C 31/02* (2006.01)
  *B29C 39/22* (2006.01)
  *B25B 5/06* (2006.01)
  *B60N 2/70* (2006.01)
  *B60N 2/72* (2006.01)

(52) U.S. Cl.
  CPC .............. *B29C 39/12* (2013.01); *B29C 39/22* (2013.01); *B29C 44/00* (2013.01); *B29C 44/58* (2013.01); *B60N 2/7017* (2013.01); *B60N 2/72* (2013.01)

(58) Field of Classification Search
  CPC . B29C 45/26; B29C 45/2602; B29C 45/2604; B29C 45/2606; B29C 39/24; A47C 31/02; A47C 31/023
  See application file for complete search history.

(56) References Cited

U.S. PATENT DOCUMENTS

| | | | | |
|---|---|---|---|---|
| 5,236,243 | A * | 8/1993 | Reyes | B60N 2/5833 24/442 |
| 6,858,171 | B1 * | 2/2005 | Wu | B29C 45/14598 264/219 |
| 6,899,399 | B2 * | 5/2005 | Ali | B60N 2/5825 297/452.6 |
| 7,674,106 | B2 * | 3/2010 | Chiu | C03B 11/08 425/190 |
| 7,815,992 | B2 * | 10/2010 | Pedde | B29C 33/12 24/302 |
| 7,905,757 | B1 * | 3/2011 | Stapleton | A63H 33/04 446/124 |
| 2002/0090409 | A1 * | 7/2002 | Seger | B29C 33/305 425/193 |
| 2003/0162008 | A1 * | 8/2003 | Cappucci | B29C 44/1271 428/304.4 |
| 2007/0011853 | A1 * | 1/2007 | Smith | B60N 2/5825 24/545 |
| 2008/0095879 | A1 * | 4/2008 | Tu | B29C 33/303 425/451.9 |
| 2013/0187401 | A1 * | 7/2013 | Gaudig | B60N 3/108 296/37.8 |
| 2015/0132422 | A1 | | 5/2015 | Yamada |
| 2017/0136667 | A1 | | 5/2017 | Kuroki |

FOREIGN PATENT DOCUMENTS

| | | |
|---|---|---|
| JP | 2013-111770 A | 6/2013 |
| JP | 2015-092926 A | 5/2015 |
| JP | 2016-010939 A | 1/2016 |
| WO | 03/070509 A2 | 8/2003 |
| WO | 2004058474 A1 | 7/2004 |
| WO | 2016/002588 A1 | 1/2016 |

OTHER PUBLICATIONS

Search Report dated Nov. 5, 2019 from the State Intellectual Property Office of the P.R.C. in application No. 201780015866.1.

* cited by examiner

[Fig. 1]
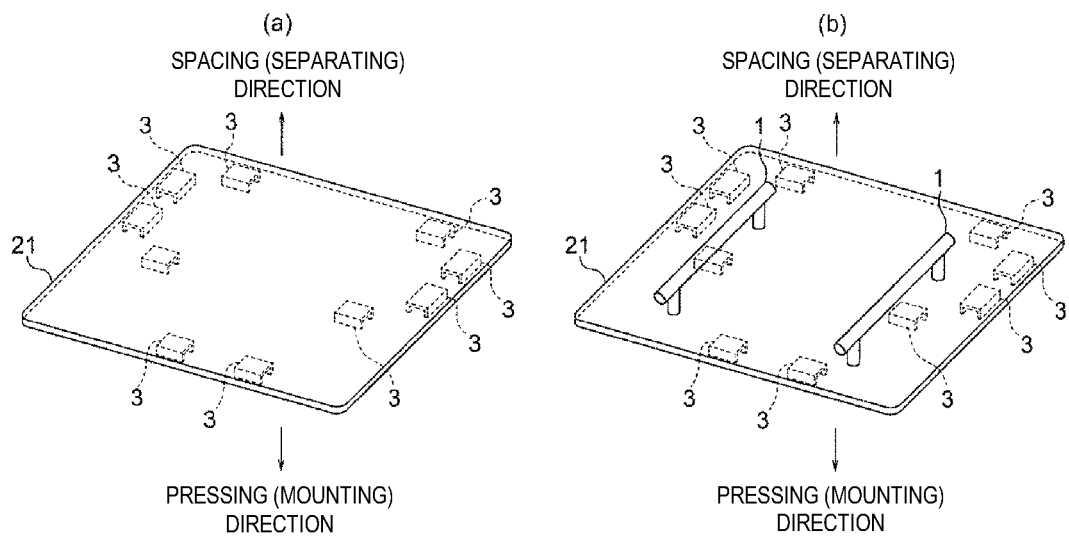
[Fig. 2]
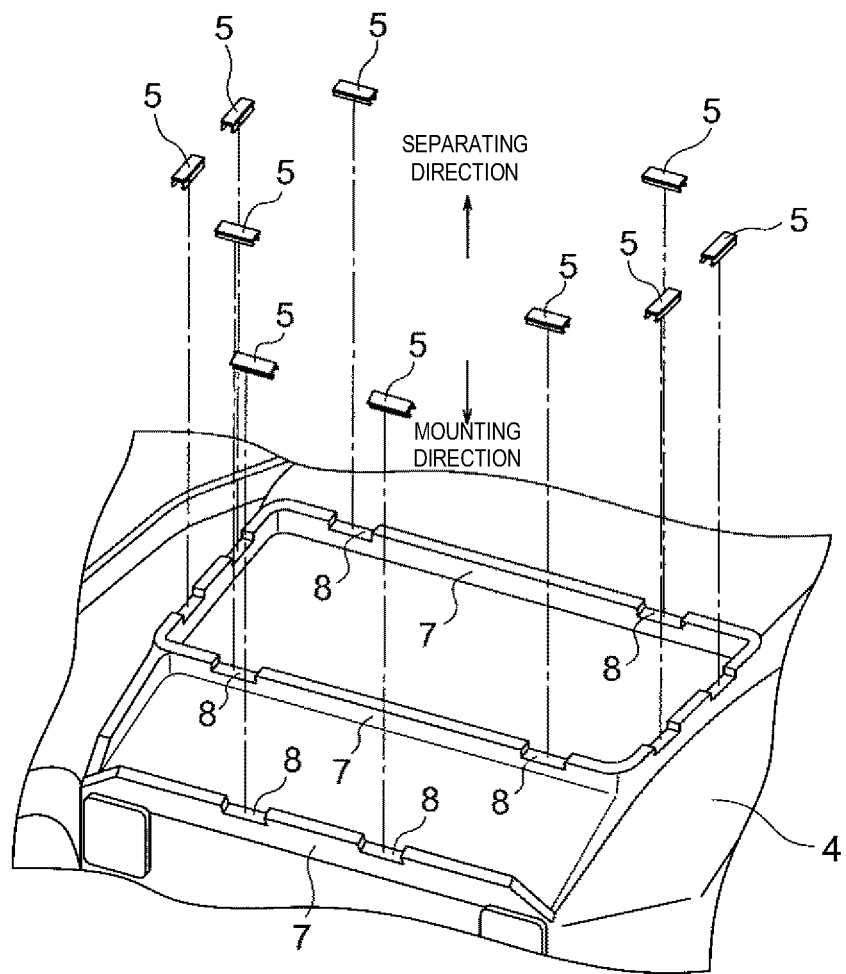

[Fig. 3]
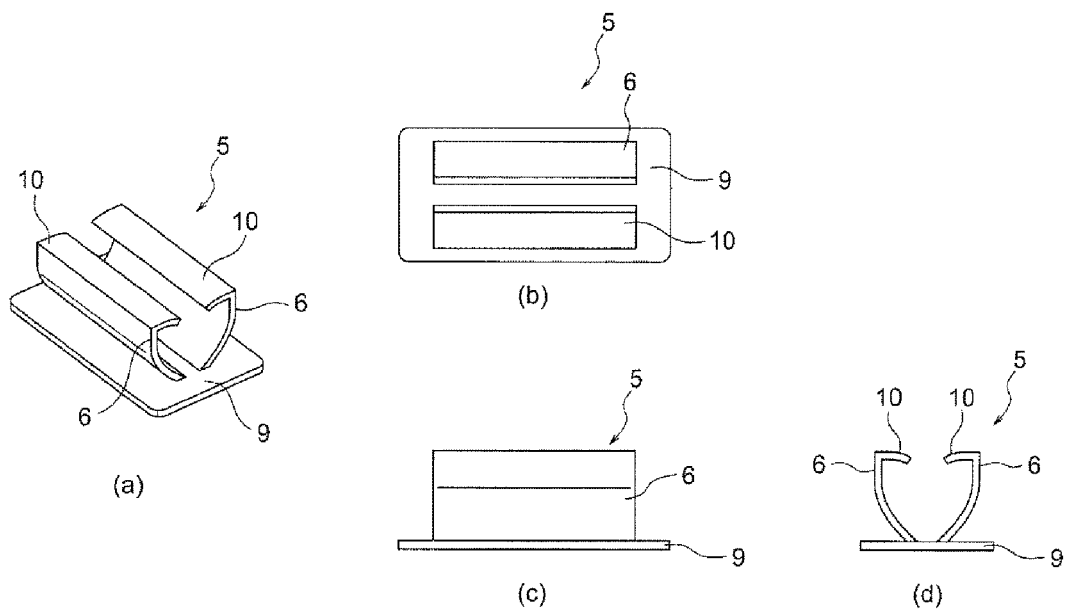
[Fig. 4]
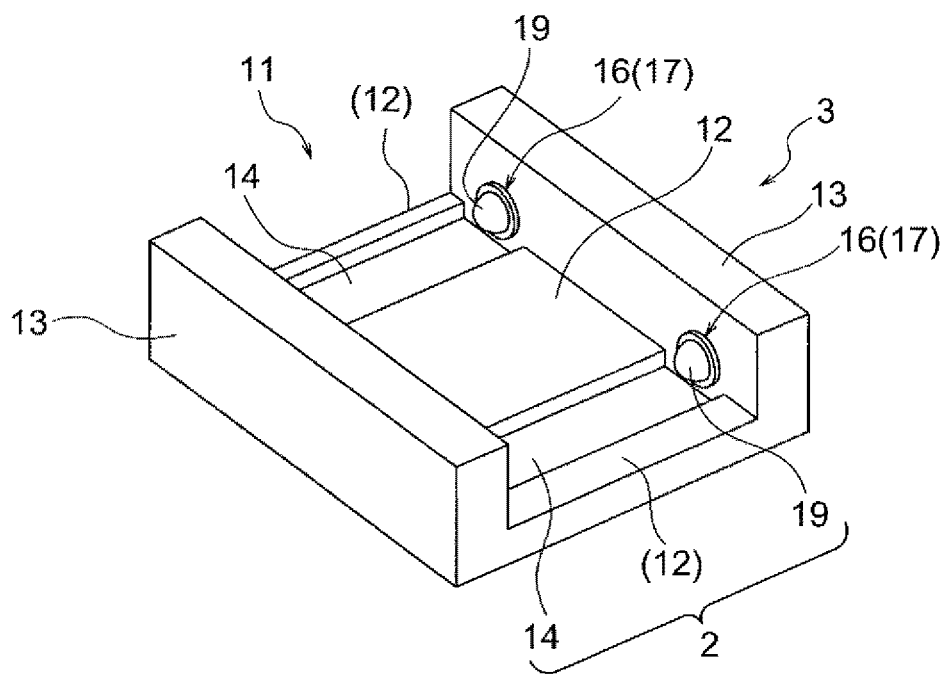

[Fig. 5]
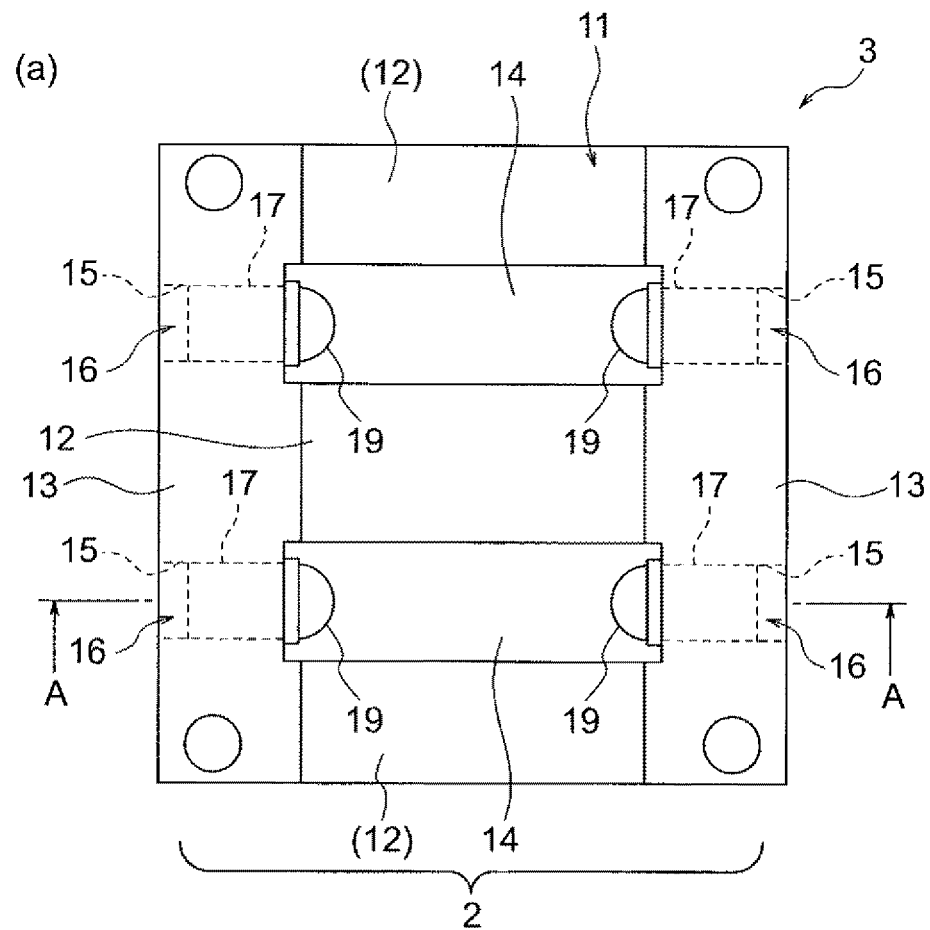
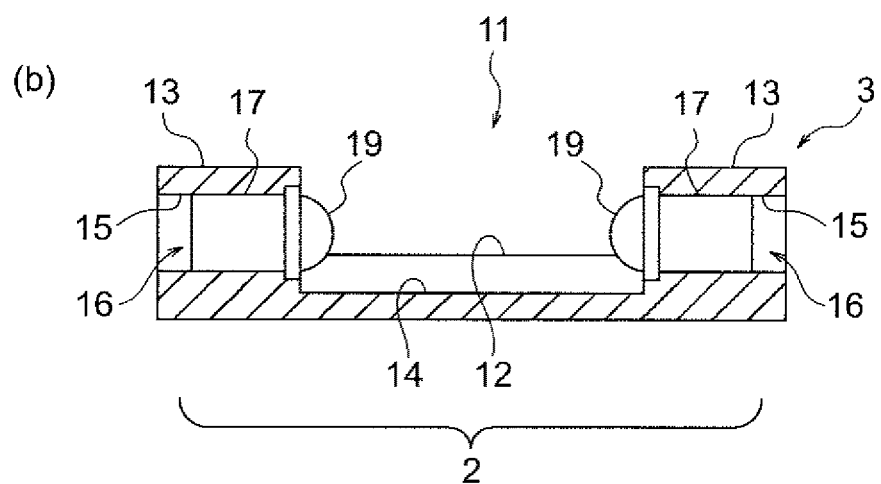

[Fig. 6]
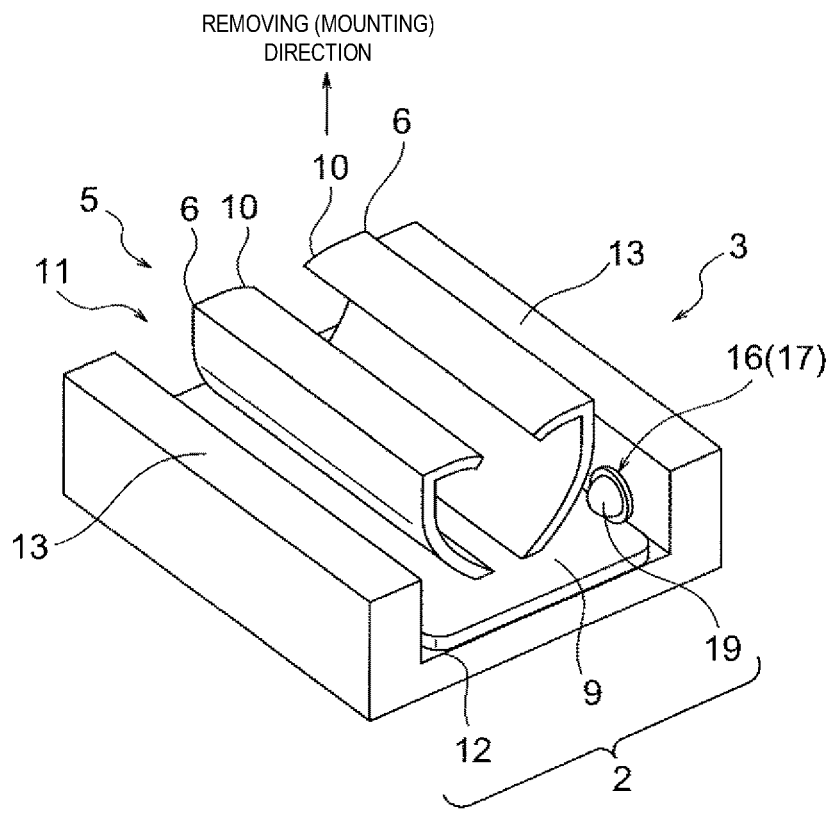
[Fig. 7]
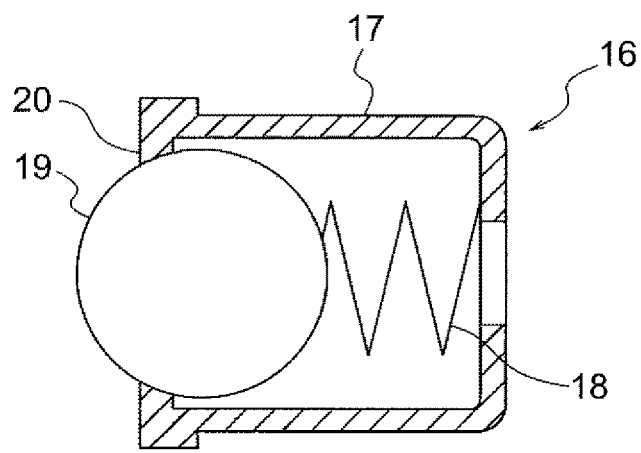

[Fig. 8]
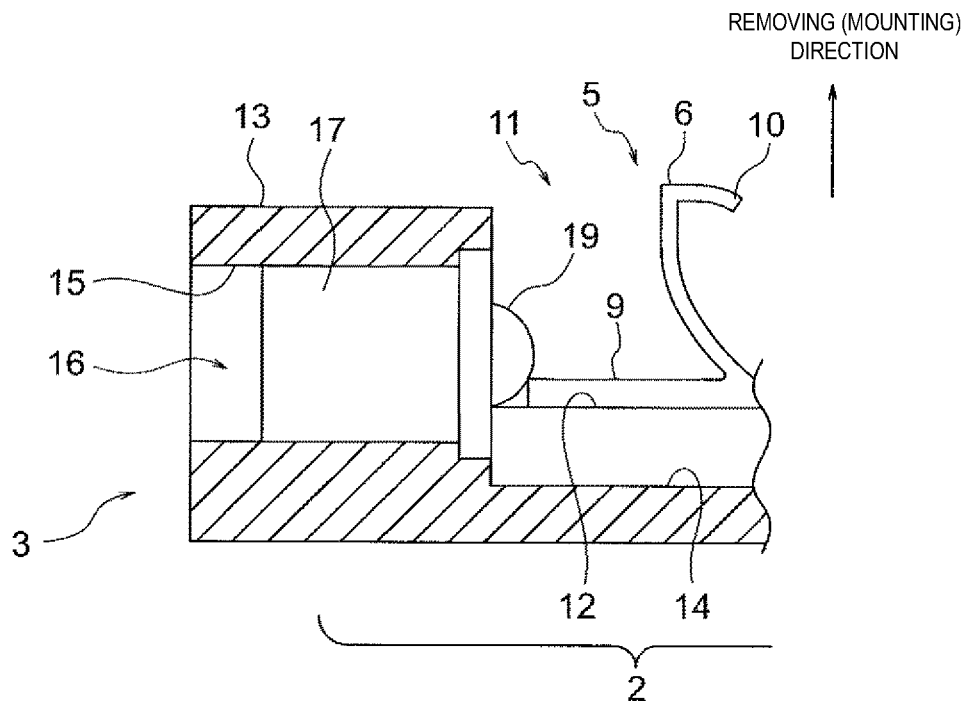
[Fig. 9]
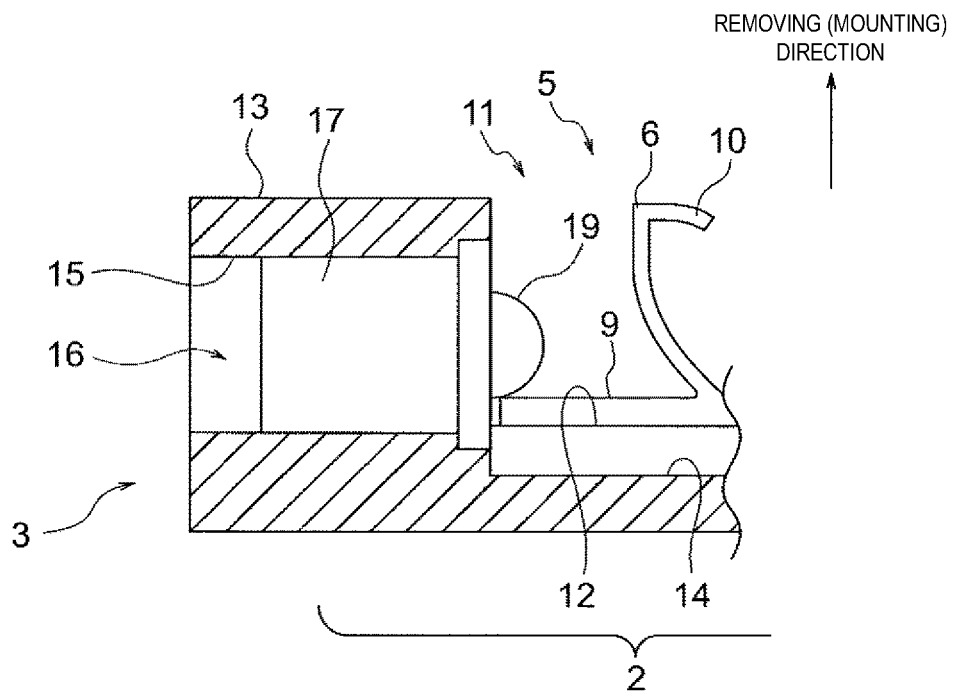

[Fig. 10]
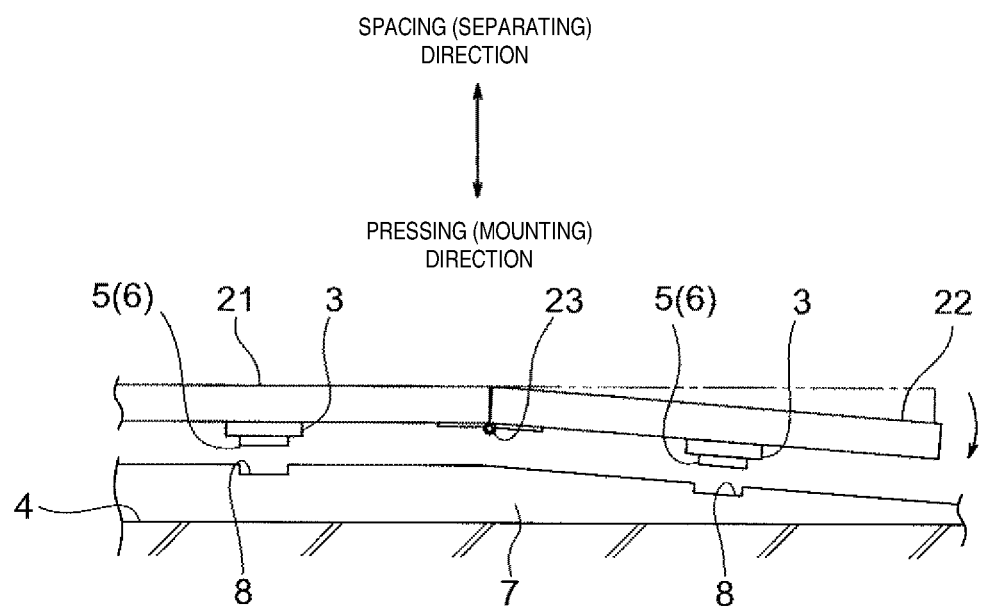

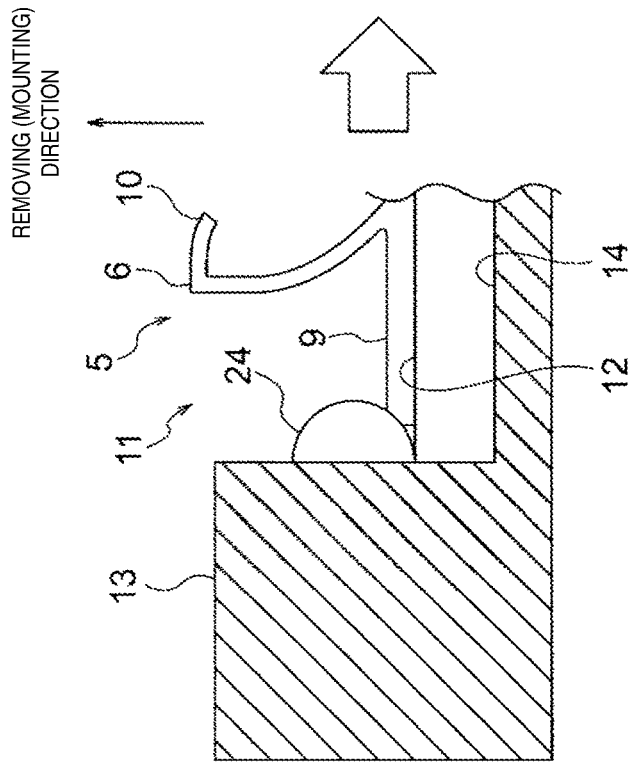
[Fig. 11]

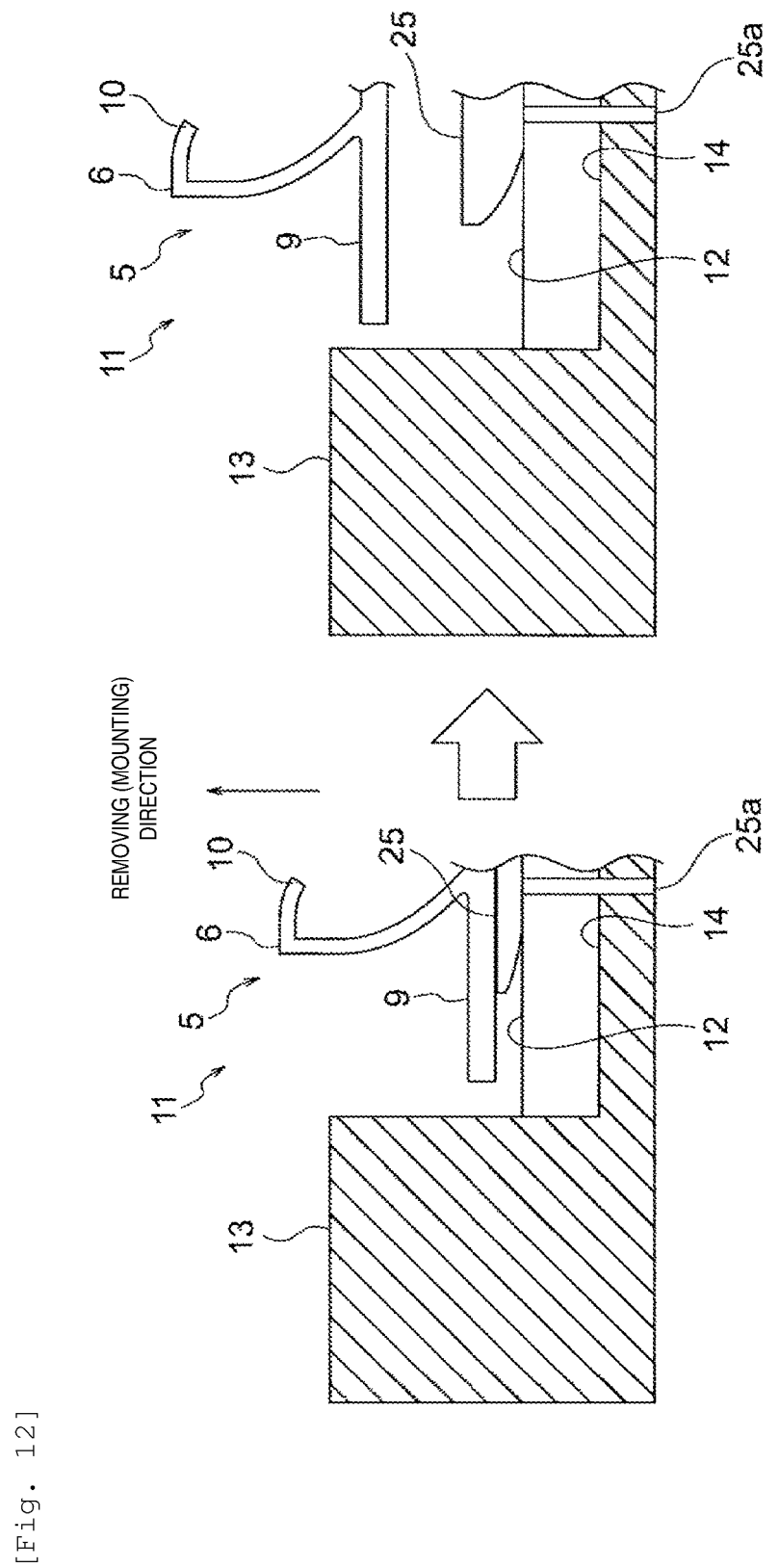

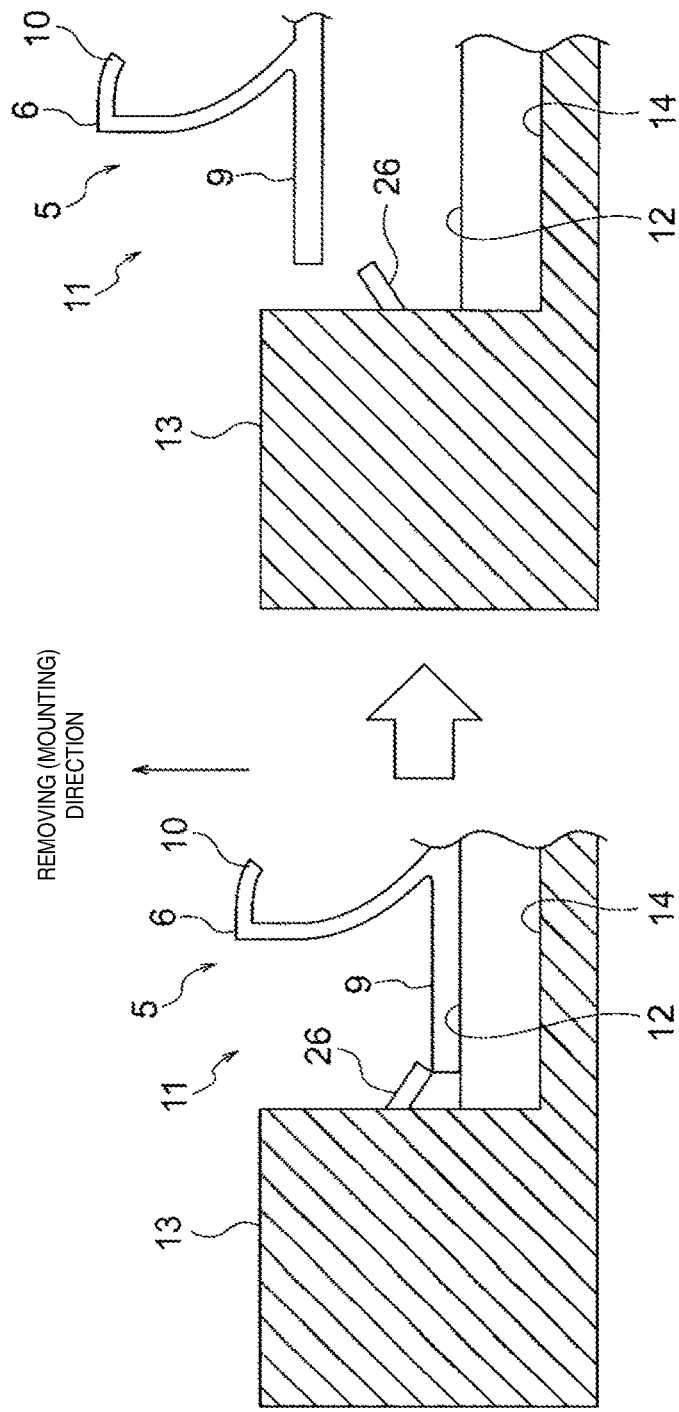
[Fig. 13]

COMPONENT-TEMPORARILY HOLDING MEMBER, AND COMPONENT MOUNTING JIG

CROSS REFERENCE TO RELATED APPLICATIONS

This application is a National Stage of International Application No. PCT/JP2017/015516 filed Apr. 18, 2017, claiming priority based on Japanese Patent Application No. 2016-083065 filed Apr. 18, 2016.

TECHNICAL FIELD

The present invention relates to a component-temporarily holding member and a component mounting jig, and particularly to a component-temporarily holding member and a component mounting jig to mount the component to a forming die for a foamed resin molding.

BACKGROUND ART

Foamed resin moldings used as pads of vehicular seats and the like are manufactured by pouring foamed resin, such as polyurethane foam, into a forming die. On a surface of the foamed resin molding, such as a vehicular seat or the like, a covering material as a sheet is mounted. A groove is formed in the foamed resin molding in order to mount the covering material, and clips are buried in a bottom of this groove. A locking tool provided in the covering material correspondingly to these clips is locked to the clips, so that the covering material is mounted on the surface of the foamed resin molding.

When manufacturing a foamed resin molding, a component, such as a clip, is mounted in advance to a forming die for foam molding, and in this state, foamed resin is injected into the forming die, thereby obtaining a foamed resin molding in a state where the component is buried. Examples of an aforementioned method for mounting a component to a forming die include a method described in Patent Literature 1 below. A method for manufacturing a foamed resin molding described in Patent Literature 1 includes steps of temporarily fastening a component to a component installation jig, installing the jig in a defined position of a forming die, subsequently injecting foamed resin into the forming die to be molded, and removing the component installation jig after the foamed resin molding is demolded.

PRIOR ART LITERATURE

Patent Literature

Patent Literature 1: Japanese Patent Laid-Open No. 2016-10939

SUMMARY OF INVENTION

Problem to be solved by the Invention

However, the aforementioned method for manufacturing a foamed resin molding described in Patent Literature 1 requires operation for removing the component installation jig as described above after the foamed resin molding is demolded and thus has such a problem that labor for the removal operation is required.

The present invention has been made in light of the above problem and an object thereof is to provide a component-temporarily holding member and a component mounting jig that do not require removal of a component installation jig after the foamed resin molding is demolded.

Means for Solving the Problem

In order to achieve the above object, the invention of claim 1 is a component-temporarily holding member having a temporary holding part for temporarily holding a component having a locking part lockable to another member when mounting the component by locking the locking part in a component mounting position of a forming die for a foamed resin molding, wherein the holding force of the temporary holding part is less than the force with which the locking part is locked in the component mounting position.

The term "lock" used herein means to fasten by engaging and in many cases, is used when fastening is comparatively easily achieved. Also, in many cases, it is used when the lock can be released or disengaged.

According to this configuration, when the locking part of the component is locked in the component mounting position of the forming die, in a state where the component is temporarily held with the temporary holding part, the locking force is greater than the force for the temporary holding part to hold the component. Thus, in that state, when the temporary holding part, i.e., the component-temporarily holding member, is separated from the forming die, the component is removed from the temporary holding part to remain in the component mounting position of the forming die. Consequently, mounting of the component to the foamed resin molding is completed without removing the component installation jig after the demolding of the foamed resin molding.

The invention of claim 2 is the component-temporarily holding member according to claim 1, wherein the temporary holding part includes a receiving part that receives the component with a defined posture and has mutually opposing portions and clamping means provided in the mutually opposing portions in the receiving part, the clamping means clamping the component with a defined biasing force to temporarily hold the component in a position where operation of locking the component to the forming die is not obstructed.

According to this configuration, when the component is received in the receiving part with the defined posture, the component is clamped and temporarily held by the clamping means and thus can be mounted and dismounted by a simple action, and the workability is excellent while operation of locking the component is not obstructed when the locking part of the component is mounted in the component mounting position of the forming die.

The invention of claim 3 is the component-temporarily holding member according to claim 2, wherein the receiving part has a bottom surface facing a direction in which the component is mounted to the forming die and at least two walls that intersect with the bottom surface and oppose to one another, and the clamping means clamps and holds the component near each opposing surface of the walls.

According to this configuration, the locking part can be locked in the component mounting position by pressing the receiving part against the forming die with the component being in contact with the bottom surface, and when the component is removed from the temporary holding part, the removal operation is not obstructed by the clamping means.

The invention of claim 4 is the component-temporarily holding member according to claim 3, wherein the clamping means has a substantially spherical part arranged on the opposing surface side and provided at a distal end that is brought into contact with the component, and biasing means biasing the substantially spherical part in a direction in which the substantially spherical part protrudes from the opposing surface.

According to this configuration, when the temporary holding part, i.e., the component-temporarily holding member, is separated from the forming die, the component is in contact with the substantially spherical part and thus is easy to slide, and the component is easily removed from the temporary holding part. In addition, the ball plunger or the like can be used as the clamping means, and thus, it is possible to simplify the structure and to reduce cost.

The invention of claim 5 is the component-temporarily holding member according to claim 4, wherein the bottom surface of the receiving part and the clamping means are arranged such that, while the component is received in the receiving part, the component is clamped and held with the bottom surface of the receiving part and the spherical part which is closer to the bottom surface than the center of a sphere of the substantially spherical part.

According to this configuration, the component can be temporarily held stably, and the holding force by the temporary holding part is easily made less than the locking force between the component mounting position and the locking part.

The invention of claim 6 is a component mounting jig to which the component-temporarily holding member according to any one of claims 1 to 5 is mounted in an arrangement corresponding to a defined position of the component in the foamed resin molding.

According to this configuration, it is possible to prevent the component from being erroneously mounted to the foamed resin molding.

The invention of claim 7 is the component mounting jig according to claim 6, wherein a moving part configured to approach and separate from the forming die is formed at least in a part of a jig base to which the component-temporarily holding member is mounted.

According to this configuration, in a case where the component mounting position of the forming die to which the component is mounted is displaced in a component-mounting direction, as well, the component can be mounted in the component mounting position using the component-temporarily holding member provided in the moving part by moving the moving part of the jig base in a direction in which the moving part approaches or separates from the forming die.

Effects of Invention

As been described above, according to the present invention, when the locking part of the component is locked in the component mounting position of the forming die, in a state where the component is temporarily held with the temporary holding part, and in that state, the temporary holding part, that is, the component-temporarily holding member, is separated from the forming die, only the component remains in the component mounting position of the forming die. As a result, removal of the component installation jig is not required after the demolding of the foamed resin molding.

BRIEF DESCRIPTION OF DRAWINGS

FIG. 1 depicts perspective views illustrating an embodiment of a component mounting jig to which component-temporarily holding members of the present invention are mounted.

FIG. 2 is a perspective view of a forming die for a foamed resin molding and components to be mounted thereto.

FIG. 3 illustrates the details of the component of FIG. 2.

FIG. 4 is a perspective view of the component-temporarily holding member of FIG. 1.

FIG. 5 depicts three-view drawings of the component-temporarily holding member of FIG. 4.

FIG. 6 is a perspective view illustrating a state where the component-temporarily holding member of FIG. 4 temporarily holds the component.

FIG. 7 is a sectional view of a ball plunger used in the component-temporarily holding member of FIG. 4.

FIG. 8 is a sectional view illustrating an arrangement of a ball and a bottom surface in the component-temporarily holding member of FIG. 4.

FIG. 9 is a sectional view illustrating an arrangement of a ball and a bottom surface in the component-temporarily holding member of FIG. 4.

FIG. 10 illustrates a modification of the component mounting jig illustrated in FIG. 1.

FIG. 11 illustrates another example of clamping means.

FIG. 12 illustrates another embodiment of the component-temporarily holding member of the present invention.

FIG. 13 illustrates a yet another embodiment of the component-temporarily holding member of the present invention.

MODE FOR CARRYING OUT THE INVENTION

The embodiment described below is to show examples of devices and methods for embodying the present invention. However, the technical idea of this invention does not limit materials, shapes, arrangements and the like of constituting components to those described below. Various changes may be made in the technical idea of the present invention within the technical scope of the appended claims.

Hereinafter, an embodiment of the component-temporarily holding member and a component mounting jig of the present invention will be described in detail with reference to the drawings. FIG. 1 depicts perspective views illustrating the component mounting jig of this embodiment, in which FIG. 1(a) shows the component mounting jig without handles, whereas FIG. 1(b) shows one provided with handles 1. This component mounting jig is formed by mounting multiple component-temporarily holding members 3 described below, on one surface of an integral (a series of) jig base 21 formed of a resin material. In this embodiment, the component-temporarily holding members 3 are mounted on a lower surface of the jig base 21 having a rectangular, plate-like shape. These component-temporarily holding members 3 are arranged in respective positions where components are mounted to a forming die 4 for a foamed resin molding described below. Note that, the shape and the material of the jig base 21 are not limited to the above.

FIG. 2 is a perspective view of the forming die 4 for a foamed resin molding and components to be mounted thereto. In this embodiment, for example, clips 5 for mounting a covering material on a surface of the foamed resin molding are components to be mounted to the forming die 4, and each of the clips 5 is buried in a bottom of a corresponding groove of the foamed resin molding. The clip 5 is formed with a locking part 6, and a locking tool of the covering material is locked to this locking part 6, so that the covering material is mounted on the surface of the foamed resin molding.

The forming die 4 for the foamed resin molding is formed with rib-like protrusions 7 for forming the grooves of the foamed resin molding. Recesses 8 are formed in the rib-like protrusions 7 mainly in order to bury the clips 5 in defined positions of the foamed resin molding. Each of the recesses 8 is formed of a recessed part of protruding edges of the rib-like protrusions 7. The recesses 8 form component mounting positions for locking the clips 5 being the components, and the locking parts 6 of the clips 5 are locked in the recesses 8, so that the clips 5 are mounted to the forming die 4. In addition, in that state, foamed resin is injected into the forming die 4 to be molded, and thereby the clips 5 are buried in the defined position of the foamed resin molding, that is, the bottoms of the grooves.

FIG. 3 illustrates the details of the clip 5 being the component, in which FIG. 3(a) is a perspective view, FIG. 3(b) is a plan view, FIG. 3(c) is a front view, and FIG. 3(d) is a side view. The clip 5 is formed of, for example, a resin material and has a rectangular plate-like base 9 and formed with a pair of the locking parts 6 that is spaced from one another by a specified amount and protrudes in the direction perpendicular to one surface of the base 9. Claws 10 extend from the protruding edges of the respective locking parts 6 to oppose to one other, and the claws 10 engage with a flange formed in the corresponding recess 8 of the forming die 4, so that the clip 5 is locked to the recess 8.

Accordingly, the clip 5 is configured such that the recess 8 of the rib-like protrusion 7 is forced into the space between the pair of locking parts 6, and thereby the locking parts 6 are locked in the recess 8. That is, the protruding direction of the pair of locking parts 6 corresponds to a direction in which the clip 5 is mounted to the forming die 4 (which is the direction in which the clip 5 is removed from a receiving part 11 described below). The posture of the clip 5 in which the pair of locking parts 6 are arranged to clamp the rib shape of the recess 8 and the base 9 is arranged in a side opposite to the rib-like protrusion 7 across the locking parts 6 is a defined posture of the clip 5 in the component-temporarily holding member 3 described below. Note that, hereinafter, the one surface of the base 9 from which the locking parts 6 protrude is referred to as a front surface as well, and the opposite surface is referred to as a back surface as well.

FIG. 4 is a perspective view of the component-temporarily holding member 3 of FIG. 1. Further, FIG. 5 depicts three-view drawings of the component-temporarily holding member 3 of FIG. 4, in which FIG. 5(a) is a plan view and FIG. 5(b) is a sectional view, taken along a line A-A of FIG. 5(a). Furthermore, FIG. 6 is a perspective view illustrating a state where the component-temporarily holding member 3 of FIG. 4 temporarily holds the clip 5 being the component. This component-temporarily holding member 3 includes a temporary holding part 2 temporarily holding the clip 5 with a defined holding force. This temporary holding part 2 has, for example, a receiving part 11 receiving the clip 5 with the defined posture, in its channel (groove) shaped interior.

The receiving part 11 is formed of, for example, a resin material and formed into the channel shape and thus has a bottom surface 12 and walls 13 that intersect with the bottom surface 12 and oppose to one another. The defined posture of the clip 5 in this embodiment indicates a posture in which the base 9 of the clip 5 is located on the bottom surface 12 side of the receiving part 11, and the opposing direction of the pair of locking parts 6 is the opposing direction of the walls 13. Accordingly, in the receiving part 11, the back surface of the base 9 of the clip 5 comes into contact with the bottom surface 12. In this bottom surface 12, two grooves 14 each continuing in the opposing direction of the walls 13 are formed.

Circular holes 15 are formed, at respective positions opposed to one another, in total of four places in the walls 13 corresponding to the grooves 14, and ball plunger 16 that form the clamping means of the present invention are buried in the respective circular holes 15. That is, the temporary holding part 2 of this embodiment is formed by including the receiving part 11 and the ball plungers 16. As illustrated in FIG. 7, for example, the ball plungers 16 each have a coil spring 18 as biasing means in a bottomed cylindrical case 17 and a ball 19 as a substantially spherical part is arranged at one end of the coil spring 18, that is, the open-end side of the case 17. The ball 19 partially protrudes outward from the case 17 in a biasing direction of the coil spring 18.

A portion of the spherical surface of the ball 19 at the radially outer end of the case 17 is regulated by a regulation part 20 formed at the edge of the open end of the case 17, not to be projected any further. That is, the ball 19 of the ball plunger 16 moves only in a direction to be pushed into the case 17 with the position regulated by the regulation part 20 of the case 17, being the outermost position. The ball pressing force (biasing force) of the coil spring 18 at a position where the ball 19 is pushed in is obtained from displacement of the coil spring 18 from a free length and spring constant of the coil spring 18.

The ball plungers 16 are buried in the respective circular holes 15 of the opposing walls 13 to oppose to one another, so that the balls 19 of the ball plungers 16 directly face one another and protrude to the receiving part 11 from the opposing surfaces of the walls 13. Accordingly, in this embodiment, when the clip 5 is received in the receiving part 11 with the defined posture, the base 9 comes into contact with the balls 19 of the opposing ball plungers 16. When the clip 5 is further pushed into the space between the opposing balls 19 from the above state, the balls 19 are pushed into the case 17 by the base 9. In addition, the biasing force of the coil springs 18 generated in a state where the clip 5 is received in the receiving part 11 is applied to the balls 19, and thus the base 9 of the clip 5 is clamped with the opposing ball plungers 16, and the clip 5 is temporarily held. Note that, the state where the clip 5 is received in the receiving part 11 is simply referred to as a clip received state as well.

In this embodiment, as will be described below, the jig base 21 of the component mounting jig is pressed against the forming die 4 to lock the locking parts 6 of the clip 5 to the recess 8 of the rib-like protrusion 7, and in this state, the jig base 21 is spaced away from the forming die 4, thereby separating the receiving part 11 of the component-temporarily holding member 3, i.e., the temporary holding part 2, the component-temporarily holding member 3 itself, from the forming die 4. When doing so, the clip 5 is removed from the temporary holding part 2 of the component-temporarily holding members 3 with the locking parts 6 being locked to the recess 8, and only the clip 5 remains in the forming die 4, so that a state where the clip 5 is mounted to the forming die 4 is maintained. To do so, the force exerted to hold the clip 5 by the coil springs 18 forming the biasing means on the balls 19 is made less than the locking force between the locking parts 6 and the recess 8. Note that, in this embodiment, the ball plungers 16 being the clamping means are provided in the opposing walls 13 of the receiving part 11, and thus the operation of locking the clip 5 to the forming die 4 is not obstructed.

The locking force between the locking parts 6 of the clip 5 and the recess 8 of the forming die 4 is known in advance, and as described above, the pushing force of the coil springs 18 to the balls 19, that is, the biasing force exerted on the balls 19 by the coil springs 18, can be also calculated. In this embodiment, the force for the ball plungers 16 to hold the clip 5 is obtained by product of the force for the coil springs 18 to bias the balls 19, i.e., the product of drag by the friction coefficient between the balls 19 and the base 9.

Accordingly, the maximum value of the holding force is obtained from, for example, the displacement of the coil springs 18 in a state where the base 9 is temporarily held by the balls 19, or the displacement of the coil springs 18 generated when the base 9 is removed from the space between the opposing balls 19. The displacement of the coil springs 18 and the spring constant are set such that the maximum value of the holding force is less than the locking force between the locking parts 6 and the recess 8, and in accordance with the displacement and the spring constant, the ball plungers 16 (coil springs 18) are selected and the positions of the ball plungers 16 are determined.

In this embodiment, the balls 19 of the ball plungers 16 protrude from the opposing surfaces of the opposing walls 13 of the receiving part 11 and make contact with the base 9 of the clip 5 near the walls 13. Although the clip 5 is removed from the temporary holding part 2 when the receiving part 11 is separated from the forming die 4 as described above, the balls 19 are in contact with the clip 5 near the walls 13, and thus the removal operation is not obstructed. Moreover, the contact area between the spherical surface of the each of the balls 19 that makes contact with the base 9 of the clip 5 and the contact object thereof is small. Therefore, it is easy to remove the clip 5 even when the clip 5 is removed from the temporary holding part 2 by sliding the base 9 of the clip 5 relative to the balls 19 as described in this embodiment.

Further, in this embodiment, the biasing means consisting of the coil spring 18 generates the biasing force in a direction crossing a direction in which the clip 5 is separated from the forming die 4. This biasing force serves as the holding force for the temporary holding part 2 to temporarily hold the clip 5. When this clip-holding force is oriented in the same direction as a direction in which the clip 5 is separated from the forming die 4, it is difficult to remove the clip 5 from the temporary holding part 2 when the receiving part 11 is separated from the forming die 4; on the other hand, when the clip-holding force is oriented in the opposite direction to the direction in which the clip 5 is separated from the forming die 4, the clip 5 may fall from the temporary holding part 2. Accordingly, the holding force by the temporary holding part 2 that is arranged to orient in a direction crossing the direction in which the clip 5 is separated from the forming die 4 is helpful to leaving only the clip 5 in the forming die 4 when the receiving part 11 is separated from the forming die 4.

Moreover, in the clip received state, it is preferable that the ball 19 and the base 9 are brought into contact with one another in such a state, for example, as illustrated in FIG. 8, that the spherical surface portion which is closer to the bottom surface 12 of the receiving part 11 than the center of the ball (sphere) 19 makes contact with the base 9. That is, the base 9 of the clip 5 is clamped and held between the spherical surface portion closer to the bottom surface 12 than the center of the ball 19 and the bottom surface 12. At this condition, the ball 19 is slightly returned to the outside of the case 17 from a state where the ball 19 is maximally pushed into the case 17 when the base 9 is pushed into the space between the opposing balls 19. For example, an angle between the direction in which the base 9 is removed from the temporary holding part 2 and the tangential line drawn at a point of contact between the ball 19 and base 9 is defined as the contact angle between the ball and the base 9. In the clip received state, the base 9 of the clip 5 is clamped and held with the spherical surface portion closer to the bottom surface 12 than the center of the ball 19 and the bottom surface 12, and thus the base 9 can be prevented from easily falling from space between the opposing balls 19 due to the contact angle between each of the balls 19 and the base 9. On the other hand, when the force for removing the clip 5 from the temporary holding part 2 acts, the contact angle between the ball 19 and base 9 gradually decreases as the base 9 is spaced away from the bottom surface 12, and thus the base 9 can be easily removed from the temporary holding part 2.

In contrast, the return amount of the ball 19 in the clip received state from the maximum pushed in state of the ball 19 when the base 9 is pushed into the space between the opposing balls 19 is large in FIG. 9 compared to that in FIG. 8. This state is a state where the length of the coil spring 18 is close to the free length, and the displacement of the coil spring 18 increases when the ball 19 is pushed into the position for removing the base 9 (which equals to the maximum pushed in state) from the above state. As the displacement of the coil spring 18 increases, a force required to remove the clip 5 from the temporary holding part 2 increases accordingly. That is, in separating the receiving part 11 from the forming die 4, the clip 5 is likely to remain within the receiving part 11.

Such a positional relationship between the base 9 and the ball 19 is determined by the positional relationship between the ball plunger 16 and the bottom surface 12 of the receiving part 11, and thus, in this embodiment, the bottom surface 12 and the ball plunger 16 are arranged such that the spherical surface portion closer to the bottom surface 12 than the center of the ball 19 makes contact with the base 9 in the clip received state. Also, the arrangement of the bottom surface 12 and the ball plunger 16 is adjusted such that the return amount of the ball 19 from the maximum pushed in state is prevented from being excessively large. Note that, for example, as illustrated in FIG. 8, when a portion of the ball 19 makes contact with the bottom surface 12 of the receiving part 11 or is located lower than the bottom surface 12, a recess, such as the groove 14, is required in a region of the bottom surface 12, which corresponds to the mounting portion of the ball plunger 16 in order to avoid interference between the ball 19 or the ball plunger 16 and the bottom surface 12. In addition, the groove 14 is needed when the ball plunger 16 is inserted into the circular hole 15 in the wall 13 of the receiving part 11.

The multiple component-temporarily holding members 3 configured in such a way are mounted on the lower surface of the jig base 21 to oppose to the recesses 8 of FIG. 2, thereby forming the component mounting jig illustrated in FIG. 1, for example. Each of the component-temporarily holding members 3 is mounted on one surface of the jig base 21 such that the channel-shaped receiving part 11 opens. These component-temporarily holding members 3 are mounted in an arrangement corresponding to the defined position of the clips 5 in the foamed resin molding. Moreover, each of the clips 5 is received in the receiving part 11 of the corresponding component-temporarily holding member 3 in the defined posture, and in this state, the jig base 21 is pressed against the forming die 4 such that the clips 5 and the component-temporarily holding members 3 oppose to the forming die 4 while holding handles 1 if the handles 1 are provided.

Consequently, the locking parts 6 of the clip 5 temporarily held in the corresponding component-temporarily holding members 3 are locked to the corresponding recess 8. In this state, the bottom surfaces 12 of the receiving part 11 face in a direction in which the clip 5 is mounted to the forming die 4. In that state, the jig base 21 is spaced away from the forming die 4 to separate the receiving part 11 of the component-temporarily holding member 3 from the forming die 4, so that the clip 5 remains in the forming die 4 in such a state that the locking parts 6 are locked to the recess 8. The mounting operation of the clip 5 to the forming die 4 is thereby completed. Thus, the removal of the component installation jig is not required after the demolding of the foamed resin molding, unlike the conventional case.

For example, in a case of various types of forming dies 4 for foamed resin molding being present in the same line, component mounting jigs are to be prepared with the component-temporarily holding members 3 being mounted at the clip-mounting positions corresponding to the types of the respective forming dies 4. Thereafter, the clips 5 are received in the receiving parts 11 of the component-temporarily holding members 3 of the corresponding component mounting jigs with the defined posture, and the clips 5 are mounted to the respective forming dies 4 by pressing each component mounting jig against the corresponding forming die 4. With this, it is possible to prevent the clips 5 from being erroneously mounted to the forming die 4 without reducing line speed. This is equivalent to preventing the clips 5 from being misassembled to the foamed resin moldings. Moreover, the clips 5 are temporarily held by only receiving the clips 5 in the receiving parts 11 of the component-temporarily holding members 3 with the defined posture, and thus the clips 5 are easily mounted and dismounted, and workability is excellent while preventing the clips 5 from being mounted with a wrong posture.

FIG. 10 illustrates a modification of the component mounting jig shown in FIG. 1. In this modification, a moving part 22 in which a part of the jig base 21 displaces is provided. Specifically, the component mounting jig is configured such that the moving part 22 bends relative to the rest portion of the jig base 21 via a hinge structure 23 to approach from a two-dot chain-line position to a solid-line position in the drawing. In the forming die 4 illustrated in FIG. 10, the height of a portion of the rib-like protrusion 7 is lowered in such a manner as to tilt towards the bottom surface of the die, and the recess 8 is formed in the tilted portion of the rib-like protrusion 7, the height of which is low. In this way, if the jig base 21 does not displace when some of the recesses 8 is positioned lower (or higher) than the other recesses 8, the locking parts 6 of the clip 5 temporarily heled in the component-temporarily holding member 3 cannot be locked to the recess 8.

In this modification, the moving part 22 that approaches (or is spaced away from) the forming die 4 is provided in a part of the jig base 21, and the component-temporarily holding member 3 is mounted to the moving part 22. With this configuration, for example, the jig base 21 is pressed against the forming die 4 to lock the clip 5 positioned at a portion other than the moving part 22 in the jig base 21 to the corresponding recess 8, and thereafter, the moving part 22 is displaced, so that the clip 5 positioned at a portion corresponding to the moving part 22 can be locked to the corresponding recess 8. Further, after all the clips 5 are locked to all the corresponding recesses 8, the jig base 21 is spaced away from the forming die 4, and all the component-temporarily holding members 3 are separated from the forming die 4, so that mounting of the clips 5 to the forming die 4 is completed.

Incidentally, in a case where the mounting position of the clip 5 is different among different types of foamed resin moldings in which the same component mounting jig can be used, for example, it is also conceivable that the component-temporarily holding member 3 which is an object for temporarily holding the clip 5 is indicated corresponding to each type of the foamed resin molding, with respect to the same component mounting jig. Then, the clip 5 is temporarily held only in the component-temporarily holding member 3 that is indicated for each different type of the foamed resin molding, and the clip 5 is mounted in the corresponding forming die 4 to manufacture the foamed resin molding. Accordingly, the same component mounting jig can be used for different types of foamed resin moldings.

Note that, although the ball 19 itself of the ball plunger 16 consists of the substantially spherical part in the aforementioned embodiment, a substantially spherical part in which a spherical contact part protrudes from a plate base can be also used instead of the ball 19, for example. Specifically, such a plunger is generally called a pin plunger or a stroke plunger, and a flange part having a diameter larger than that of the substantially spherical part is housed in the case 17 of FIG. 7 and biased by the coil spring 18. The substantially spherical part extending from this flange part protrudes from the case 17 as with the ball 19 of the ball plunger 16, and the protruding amount thereof is regulated by regulating the flange part by the regulation part 20. This substantially spherical part protrudes to the receiving part 11 as with the ball 19 of the ball plunger 16, and thereby the base 9 of the clip 5 can be clamped and held by the biasing force of the coil spring 18.

Moreover, although the ball plunger 16 is used as the clamping means in the aforementioned embodiment, the clamping means can be something other than the ball plunger 16. In addition, it is also possible to form a structure equivalent to the ball plunger 16 in the wall 13 of the receiving part 11. In such a case as well, the holding force of the temporary holding part exerted by the clamping means may be set by a similar technique on one described above. Examples of different type of the clamping means include a hemispherical member formed of an elastic body, such as rubber, or of a rigid body, such as metal, a bent leaf spring member formed by bending a leaf spring, and the like. For example, as illustrated in FIG. 11, when a substantially hemispherical part of a hemispherical elastic member 24 protrudes to the receiving part 11 at a position of the ball 19 of the ball plunger 16 in FIG. 6, the elastic body is deformed in pushing in and pulling out the base 9 of the clip 5, so that the base 9 can be pushed in and pulled out. In addition, for example, the bent leaf spring member is formed by bending a leaf spring into an L shape, for example, and only one end thereof is fixed to the wall 13 with an extension direction of the L shape directed toward the mounting/removing direction of the clip 5, and the bent part is arranged at a position farther from the bottom surface 12 than the base 9 of the clip 5 received in the receiving part 11, thereby deforming the leaf spring when the base 9 of the clip 5 is pushed in and pulled out; consequently, the base 9 can be pushed in and pulled out. At that time, the amount of deformation and elastic modulus of each of the hemispherical elastic member and the bent leaf spring member is appropriately set, so that the holding force of the temporary holding part can be set. Moreover, in a case where metal is used as the hemispherical member, for example, when the substantially hemispherical part of the hemispherical metal member protrudes to the receiving part 11 at a position of the ball 19 of the ball plunger 16 in FIG. 6, the base 9 of the clip 5 is elastically deformed when being pushed in or pulled out, so that the base 9 can be pushed in and pulled out.

Moreover, the balls 19 being the temporary holding part are arranged to directly face one another in the aforementioned embodiment but do not necessarily directly face one another, so long as to oppose to each other across the clip 5, i.e., the component.

Moreover, the receiving part 11 is not limited to the one having a channel shape and may be any one having the bottom surface 12 with which the clip 5 makes contact and two or more walls 13 extending in a direction crossing the bottom surface 12 and facing one another.

Moreover, a form in which the temporary holding part temporarily holds the component is not necessarily limited to one in which the clip 5 is clamped by a defined biasing force. Specifically, as illustrated in FIG. 12, for example, a suction cup 25 may be mounted on a site of the bottom surface 12 of the receiving part 11, so that the base 9 of the clip 5 is adhered by the suction cup 25. In that case, as illustrated in the figure, an air inlet 25a communicating between inside and outside of the suction cup 25 is provided, so that air between the clip 5 and the suction cup 25 is sucked or ejected through the air inlet 25a to enable the clip 5 to be smoothly mounted or removed. Alternatively, in a case where the clip 5 is a magnetic body, a magnet may be mounted on a site of the bottom surface 12 of the receiving part 11 as with the above case, so that the base 9 of the clip 5 is magnetically adhered by this magnet. In these cases, the suction force of the suction cup and the magnetic adhesion force of the magnet are the force for holding the clip 5.

Moreover, as illustrated in FIG. 13, a pressing piece 26 that makes contact with the base 9 of the clip 5 and rotates may be provided on the wall 13 to protrude to the receiving part 11, so that the base 9 of the clip 5 is pressed on the bottom surface 12 by the rotation of the pressing piece 26. The pressing piece 26 is configured to be biased toward the bottom surface 12 of the receiving part 11 by the biasing member, such as a spring material. In addition, when the clip 5 is removed from the receiving part 11, the pressing piece 26 rotates in a reverse direction to release the base 9 from being regulated.

Furthermore, other ways may be provided, such as arranging an adhesive tape on the clip 5 or the bottom surface 12 of the receiving part 11, forming a hole in the bottom surface of the clip 5 and arranging an arrowhead-shaped pin on the bottom surface 12 of the receiving part 11, and the like.

Moreover, the component to be mounted to the forming die 4 for foamed resin molding may be a component other than the clip 5.

It is naturally understood that the present invention includes various embodiments that are not described above. Therefore, the technical scope of the present invention is defined only by the invention-defining matters according to the reasonable scope of the claims of the invention in view of the above description.

REFERENCE SIGNS LIST

2 temporary holding part
3 component-temporarily holding member
4 forming die
5 clip (component)
6 locking part
8 recess (component mounting position)
9 base
11 receiving part
12 bottom surface
13 wall
16 ball plunger (clamping means)
18 coil spring (biasing means)
19 ball (substantially spherical part)
21 jig base
22 moving part

The invention claimed is:

1. A component-temporarily holding member comprising a temporary holding part for temporarily holding a component having a locking part lockable to another member when mounting the component by locking the locking part in a component mounting position of a forming die for a foamed resin molding,
    wherein a holding force of the temporary holding part is less than force with which the locking part is locked in the component mounting position.

2. The component-temporarily holding member according to claim 1, wherein the temporary holding part includes
    a receiving part that receives the component with a defined posture and has mutually opposing portions and
    clamping means provided in the mutually opposing portions in the receiving part, the clamping means clamping the component with a defined biasing force to temporarily hold the component in a position where operation of locking the component to the forming die is not obstructed.

3. The component-temporarily holding member according to claim 2, wherein the receiving part has a bottom surface facing a direction in which the component is mounted to the forming die and at least two walls that intersect with the bottom surface and oppose to one another, and
    the clamping means clamps and holds the component near opposing surfaces of the walls.

4. The component-temporarily holding member according to claim 3, wherein the clamping means has
    a substantially spherical part arranged on the opposing surface side and provided at a distal end that is brought into contact with the component, and
    biasing means biasing the substantially spherical part in a direction in which the substantially spherical part protrudes from the opposing surface.

5. The component-temporarily holding member according to claim 4, wherein the bottom surface of the receiving part and the clamping means are arranged such that, while the component is received in the receiving part, the component is clamped and held between the bottom surface of the receiving part and the spherical part which is closer to the bottom surface than the center of the sphere of the substantially spherical part.

6. A component mounting jig, to which the component-temporarily holding member according to claim 1 is mounted in an arrangement corresponding to a defined position of the component in the foamed resin molding.

7. The component mounting jig according to claim 6, wherein a moving part configured to approach and separate from the forming die is formed at least in a part of a jig base to which the component-temporarily holding member is mounted.

* * * * *